Oct. 16, 1956

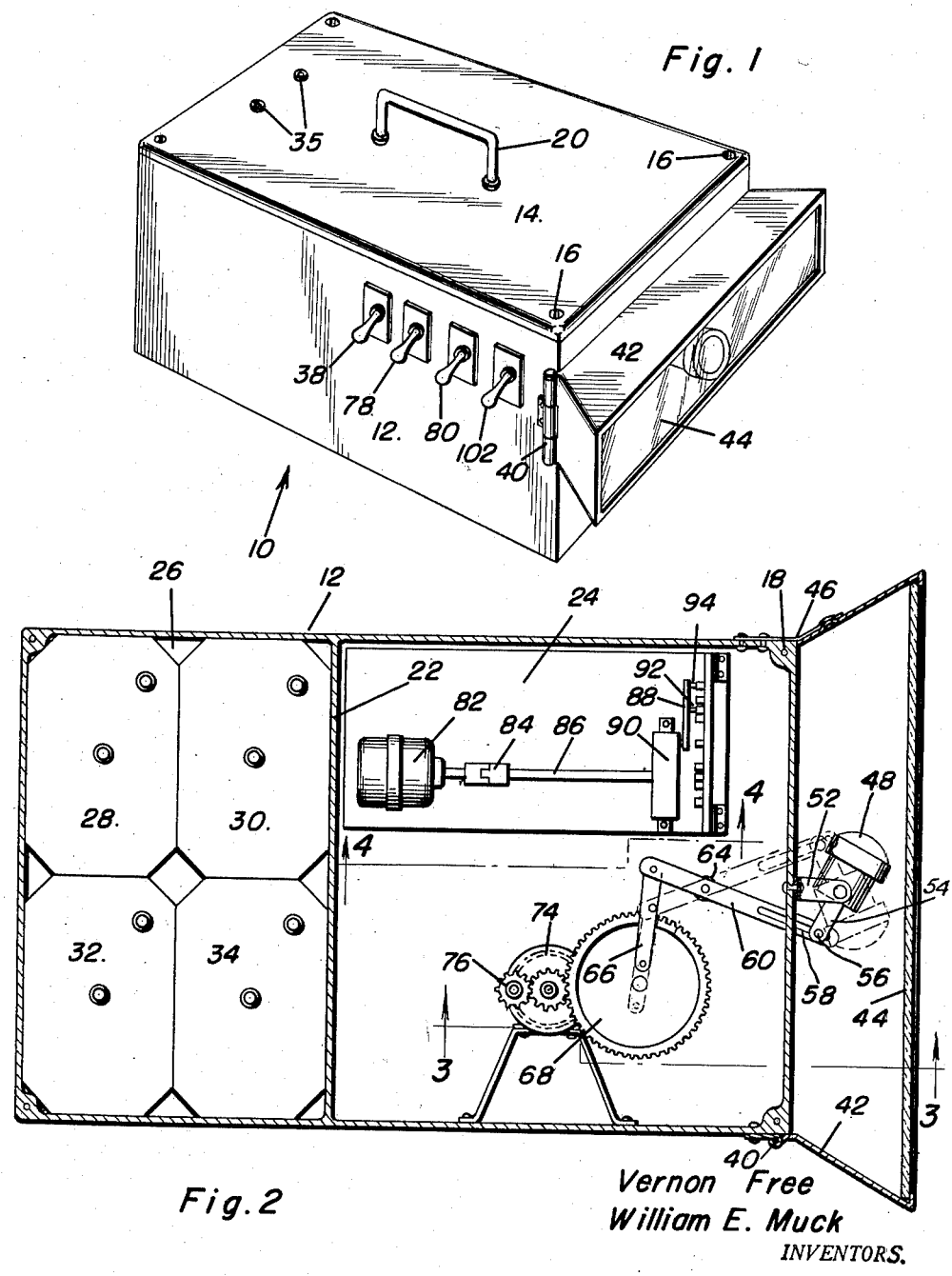

V. FREE ET AL 2,767,390

EMERGENCY ROAD LIGHT

Filed July 21, 1953

Vernon Free
William E. Muck
    INVENTORS.

BY *Clarence A. O'Brien*
and *Harvey B. Jacobson*
            Attorneys

Vernon Free
William E. Muck
INVENTORS.

United States Patent Office 2,767,390
Patented Oct. 16, 1956

2,767,390

EMERGENCY ROAD LIGHT

Vernon Free and William E. Muck, Everett, Wash., assignors of seventeen and one-half percent to said Free, forty-two and one-half percent to said Muck, and fifteen percent to Thomas G. McCrea and twenty-five percent to James Davis, both of Everett, Wash.

Application July 21, 1953, Serial No. 369,424

1 Claim. (Cl. 340—50)

This invention relates to illuminated signalling devices and more particularly to an apparatus which is generally fitted for use in any emergency and which is especially adaptable for use in control of traffic on the highway and in the repair of a vehicle.

The primary object of this invention resides in the provision of an emergency road light which is highly flexible in its operation and capable of providing illumination for various emergencies that might arise on the highway.

The construction of this invention features a signal lamp which is mounted on a casing for pivoting oscillatory movement. Means are provided within the casing for operating the lamp, and means are also provided for alternatively providing the lamp with a steady flow of power to thereby provide a steady illumination while means are also provided for intermittently breaking or interrupting the flow of power to thereby provide a flashing signal.

There is provided in this emergency road lamp suitable means for providing power to a trouble light so as to enable a motorist to make repairs to his vehicle should such suffer a breakdown. Additionally, the signal lamp is mounted in such a manner on this device that it may oscillate and wag back and forth at a very large angle so as to enable the control of traffic along the full width of the highway.

Still further objects and features of this invention reside in the provision of an emergency road light that is strong and durable, comparatively simple in construction and manufacture, which is provided with separately connected batteries forming independent sources of power whereby should any individual one of these batteries become exhausted, the lamp may still be used for emergency purposes and which emergency road light is easily carried in an automobile and which is especially adapted for civil defense and disaster control.

These, together with the various ancillary objects and features of the invention which will become apparent as the following description proceeds, are attained by this emergency road light, a preferred embodiment of which has been illustrated in the accompanying drawings, by way of example only, wherein:

Figure 1 is a perspective view of the emergency road light comprising the present invention;

Figure 2 is an enlarged horizontal sectional view of this device;

Figure 3:
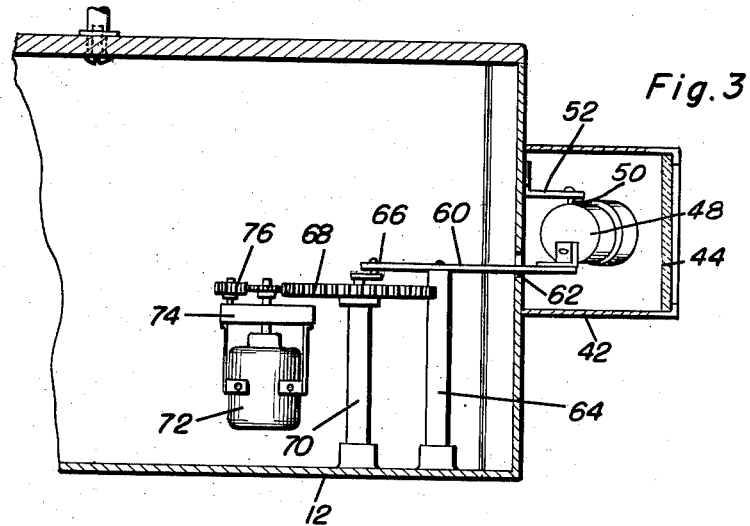
Figure 3 is a sectional detail view as taken along the plane of line 3—3 in Figure 2.
Figure 4:
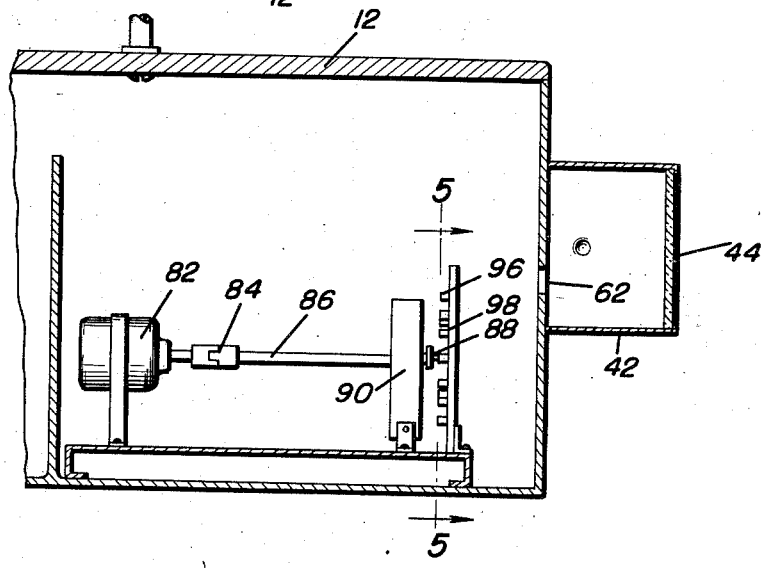
Figure 4 is a sectional detail view as taken along the plane of line 4—4 in Figure 2 and illustrating in detail the means utilized for providing an intermittent signal to the signal lamp.
Figure 5:
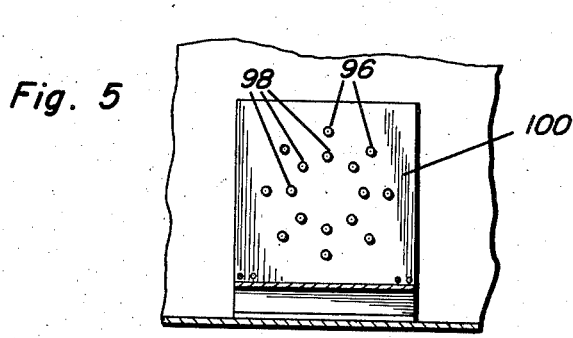
Figure 5 is a sectional detail view as taken along the plane of line 5—5 in Figure 4 illustrating the construction of the plate having the plurality of sets of contact members mounted thereon.
Figure 6:
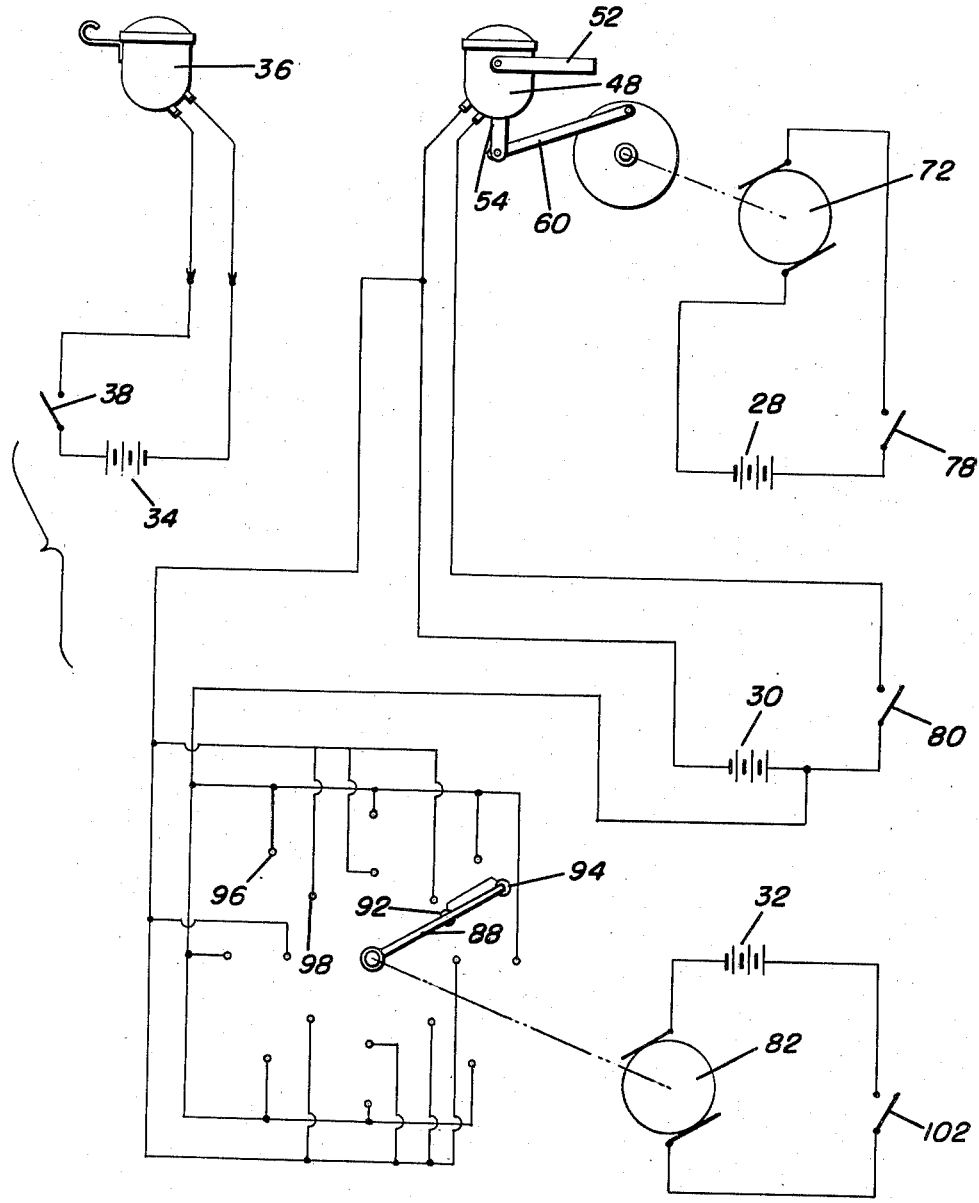
Figure 6 is a circuit diagram of the electrical components used in this invention.

With continuing reference to the accompanying drawings wherein like reference numerals designate similar parts throughout the various views, reference numeral 10 generally designates the emergency road light comprising the present invention. This emergency road light 10 includes a casing 12 provided with a removable top 14 which is held in place by screws 16 or other suitable fasteners which extend into threaded apertures 18 formed at the corners of the casing 12. A handle 20 is, of course, provided for enabling the convenient portation of this apparatus.

Within this casing 12, there is a partition wall 22 which divides the casing into an operating portion 24 and a battery or hollow portion 26. Within the battery portion 26 are individual batteries 28, 30, 32 and 34 which provide the electrical power for separately excited electrical circuits. Female connector elements 35 are provided for enabling a trouble lamp 36 to be connected to the battery 34. A switch 38 is provided on the casing 12 for the transfer of electrical power to the trouble light 36.

By means of a hinge 40, a lens housing 42 in which a transparent lens 44 is mounted is secured to the casing 12. The lens housing 42 is of outwardly flared, trapezoidal shape and is lockingly held against the casing by means of a catch 46. Within the housing 42 when in the closed position, there is mounted a signal lamp 48 which is pivotally attached by means of a pin or rivet 50 on a trunnion 52.

Connected to the signal lamp 48 is an operating lever 54 which carries a pin 56. The pin 56 is adapted to ride within an elongated slot 58 formed in a connecting rod 60, the connecting rod 60 extending through a horizontally extending slot 62 formed in the casing 12 and being mounted upon a vertical standard 64 at a point intermediate the ends of the connecting rod 60 and most remote from the pin 56. The connecting rod 60 is pivotally attached to a crank arm 66 eccentrically mounted on a driven gear 68 supported by another vertical standard 70 secured in the operating section 24 of the casing 12. The gear 68 is driven by an electrically operated motor 72 through a suitable reduction gear box 74 and a gear train as at 76. Power for the motor 72 is provided by the battery 28 and an individual switch 78 is provided for control of the flow of power from the battery 28 to the motor 72. It is to be noted that if it is desired for the signal lamp 48 to be continuously excited so as to provide constant illumination, the switch 80 controlling the flow of power from the battery 30 can be thrown to the on position.

Also mounted within the operating portion 24 of the casing 12 is another electric motor 82 which drives through a suitable spline connection 84 a shaft 86 which is connected to a circuit making and breaking arm 88 by means of a suitable gear reduction box 90. Of course, the make and break contact arm 88 is suitably insulated from the gears in the gear reduction box 90. On the make and break contact arm 88 there are a pair of contacts 92 and 94 which are adapted to complete an operative electrical circuit between a selected one of the outer ring of contacts as indicated at 96 and the inner ring of contacts 98. The contacts 96 and 98 are mounted on a plate 100 and are suitably insulated from each other by any convenient means. The contacts 96 and 98 are connected electrically to the two opposed terminals of the battery 30 so as to provide an alternate means of completing an operative electrical circuit from the battery 30 to the lamp 48. However, when the contact arm 88 is rotating, there will be provided an intermittent signal to the lamp 48 which will cause a flashing signal. It is to be noted that the motor 82 is operatively electrically connected to the battery 32 through the switch 102.

In operation, the device is controlled by the switches 38, 78, 80 and 102 to provide such signalling services as may be necessary, or to provide power for a trouble light. With the switch 38 in the on position and a trouble lamp 36 connected to the female connectors 35, means for providing illumination for repairing a breakdown to a vehicle or for such other purposes as may be necessary is provided. With the switch 80 in a closed position, a steady flow of current is provided to the signal light 48 which provides a continuous illumination. Of course, as may be desired, the signal lamp 48 may be provided with either a red colored bulb or with a red colored lens, or in fact, the lens 44 may be colored as desired. Then, if the switch 78 were to be closed, the motor 72 would cause an oscillation of the lamp 48 which would provide a signal lamp which, wagging back and forth, would sweep the full width of any highway. If the switch 102 were to be closed, there would be provided an interruption to the signal from the battery 30 which would cause the light emanating from the signal lamp 48 to be a flashing light.

Since from the foregoing, the construction and advantages of this emergency road light are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

An emergency road lamp for use as a signal device comprising a casing, a signal lamp pivotally attached to said casing, a lens housing hingedly secured to said casing and adapted to overlie said signal lamp, sources of electrical power, means connected to said sources of electrical power for oscillating said signal lamp, a slot in said casing, said means for oscillating said signal lamp including an operating lever secured to said signal lamp, a connecting rod pivotally attached to said operating lever and extending through said slot, a crank arm pivotally attached to said connecting rod, and drive means for actuating said crank arm, said connecting rod having an elongated slot therein, and a pin secured to said operating lever extending through said elongated slot.

References Cited in the file of this patent

UNITED STATES PATENTS

| | | |
|---|---|---|
| 2,088,370 | Gingras | July 27, 1937 |
| 2,262,239 | Kennelly | Nov. 11, 1941 |
| 2,317,713 | Aufiero | Apr. 27, 1943 |
| 2,491,094 | DuFrane | Dec. 13, 1949 |
| 2,557,859 | Bernstein | June 19, 1951 |
| 2,572,439 | Brazier | Oct. 23, 1951 |
| 2,657,379 | Zappia | Oct. 27, 1953 |